US012812378B2

(12) United States Patent
Pang et al.

(10) Patent No.: US 12,812,378 B2
(45) Date of Patent: Nov. 24, 2026

(54) WIRELESS AUTOMATION NETWORK SOURCE AND DESTINATION DEVICE

(71) Applicant: ABB Schweiz AG, Baden (CH)

(72) Inventors: Zhibo Pang, Västerås (SE); Alf Isaksson, Västerås (SE)

(73) Assignee: ABB Schweiz AG, Baden (CH)

( * ) Notice: Subject to any disclaimer, the term of this patent is extended or adjusted under 35 U.S.C. 154(b) by 326 days.

(21) Appl. No.: 18/506,258

(22) Filed: Nov. 10, 2023

(65) Prior Publication Data

US 2024/0155346 A1 May 9, 2024

Related U.S. Application Data

(63) Continuation of application No. PCT/EP2022/061033, filed on Apr. 26, 2022.

(30) Foreign Application Priority Data

May 10, 2021 (EP) .................................... 21173055

(51) Int. Cl.
*G06F 21/35* (2013.01)
*H04L 9/32* (2006.01)
*H04W 12/08* (2021.01)
*H04W 12/104* (2021.01)
*H04W 12/63* (2021.01)
*H04W 64/00* (2009.01)

(52) U.S. Cl.
CPC ......... *H04W 12/104* (2021.01); *H04W 12/08* (2013.01); *H04W 12/63* (2021.01); *H04W 64/00* (2013.01)

(58) Field of Classification Search
CPC .................................................. H04W 12/104
See application file for complete search history.

(56) References Cited

U.S. PATENT DOCUMENTS

2012/0302219 A1* 11/2012 Vang ..................... H04W 4/023 455/414.1
2017/0139388 A1* 5/2017 Sachs ........................ H04L 1/00
(Continued)

FOREIGN PATENT DOCUMENTS

CA 2779402 C * 1/2018 ........... H04L 67/125
CN 107534683 B * 8/2020 ............. H04L 45/00
EP 3364687 A1 * 8/2018 ........... H04L 45/306
(Continued)

OTHER PUBLICATIONS

English version of CA 2779402 C, Mignot Pierre, Jan. 2, 2018, all pages (Year: 2018).*
(Continued)

*Primary Examiner* — Haresh N Patel
(74) *Attorney, Agent, or Firm* — Fitch Even Tabin & Flannery LLP

(57) ABSTRACT

A wireless automation network (WAN) source device is configured to generate a WAN data packet containing a payload with automation data according to a WAN communication protocol, and to transmit the data packet to a WAN destination device; wherein the WAN source device comprises a wireless localization engine configured to generate a source location stamp and at least one packet wrapper configured to insert the source location stamp in the data packet.

17 Claims, 3 Drawing Sheets

(56) References Cited

U.S. PATENT DOCUMENTS

| | | | | |
|---|---|---|---|---|
| 2017/0195826 | A1 | 7/2017 | Shaikh et al. | |
| 2020/0213146 | A1* | 7/2020 | Kodam | G01N 33/0057 |

FOREIGN PATENT DOCUMENTS

| | | | | |
|---|---|---|---|---|
| EP | 3429134 | A1 * | 1/2019 | H04L 12/2838 |
| EP | 3535993 | B1 * | 4/2021 | G01S 19/48 |
| KR | 101871715 | B1 * | 6/2018 | H04W 12/08 |
| KR | 102134506 | B1 * | 7/2020 | G01S 19/45 |
| WO | WO-2018233041 | A1 * | 12/2018 | H04W 12/02 |

OTHER PUBLICATIONS

English version of CN 107534683 B, Navali et al., Aug. 28, 2020, all pages (Year: 2020).*

English version of EP 3364687 A1, Pang et al., Aug. 22, 2018, all pages (Year: 2018).*

English version of EP 3429134 A1, Cherubini Lionello, Jan. 16, 2019, all pages (Year: 2019).*

English version of EP 3535993 B1, Struhsaker et al., Apr. 21, 2021, all pages (Year: 2021).*

English version of WO 2018233041 A1, Dec. 27, 2018, Du et al., all pages (Year: 2018).*

English version of KR 101871715 B1, Jun. 27, 2018, All pages (Year: 2018).*

English version, KR 102134506 B1, Jul. 16, 2020, all pages (Year: 2020).*

European Patent Office, Extended European Search Report in European Patent Application No. 21173055.1, 13 pp. (Oct. 25, 2021).

European Patent Office, International Search Report in International Patent Application No. PCT/EP2022/061033, 3 pp. (Jul. 20, 2022).

European Patent Office, Written Opinion in International Patent Application No. PCT/EP2022/061033, 11 pp. (Jul. 20, 2022).

* cited by examiner

WIRELESS AUTOMATION NETWORK SOURCE AND DESTINATION DEVICE

CROSS-REFERENCE TO RELATED APPLICATIONS

The instant application claims priority to International Patent Application No. PCT/EP2022/061033, filed Apr. 26, 2022, and to European Patent Application No. 21173055.1, filed May 10, 2021, each of which is incorporated herein in its entirety by reference.

FIELD OF THE DISCLOSURE

The present disclosure generally relates to a wireless automation network (WAN) and, more particularly, to WAN systems, devices, and related methods.

BACKGROUND OF THE INVENTION

Location information is broadly needed in industrial automation systems, e.g., for personnel and asset tracking, engineering and maintenance, access control, control of mobile equipment, security surveillance, safety patrol, evacuation and rescue, etc. Accurate location information can also be used to improve the security of wireless communication from the physical layer to complement the traditional cryptography base security mechanisms, because any spoofing of the signal will increase extra delay, which will be noticed easily by detecting the abnormal change of distance/location. Today, adding and processing location information are implemented in higher-level automation applications on a case-by-case basis instead of in the WAN. To do this, an extra cross-layer interface is needed for the automation applications to access the location information from the bottom of a WAN interface, but such a cross-layer design is not recommended due to the lack of a standard and violation to the layer-based design principal of communication stacks. More importantly, many end users of the devices do not want to share the location information to certain applications due to privacy concerns.

BRIEF SUMMARY OF THE INVENTION

The present disclosure describes a WAN source device, a WAN destination device, a WAN system, a WAN, device comprising the source device and the destination device, a method for communication and localization in a WAN, and a usage of a WAN destination and/or source device for authenticated wireless communication and for wireless localization. In one aspect, the disclosure describes an improved system and method for transmitting location information in industrial automation systems.

The described embodiments similarly pertain to the WAN source device, the WAN destination device, the WAN system comprising the source device and the destination device, the method for communication and localization in a WAN, and the usage of a WAN destination and/or source device for authenticated wireless communication and for wireless localization. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a wireless automation network, WAN, source device is provided. The WAN source device is configured to generate a WAN data packet containing a payload with automation data according to a WAN communication protocol, and to transmit the data packet to a WAN destination device. The WAN source device comprises a wireless localization engine configured to generate a source location stamp, and at least one packet wrapper configured to insert the source location stamp in the data packet.

The automation data may be data of an industrial process that is collected, for example, by an industrial sensor. The wireless localization engine may determine the location using devices or methods known to a skilled person, for example, by a triangulation method using run times of electromagnetic waves, signal strength, reception directivities, etc. The WAN source device therefore is enabled to transmit a location information using the packets that also contain the data payload. The location stamp comprises at least a location information or location value. More details are given further below.

BRIEF DESCRIPTION OF THE SEVERAL VIEWS OF THE DRAWING(S)

The figures are merely schematic and not to scale. In principle, identical or similar parts are given the same reference signs.

DETAILED DESCRIPTION OF THE INVENTION

For each communication link, a pair of logical devices, a source device, also designated as "link source" in the following and a destination device, also designated as "link destination" in the following, are equipped with the functionalities not only for wireless communication but also for wireless localization. The location information is added to the communication packets and the communication packets are processed based on not only the network addresses but also the location stamps.

Figure 1:
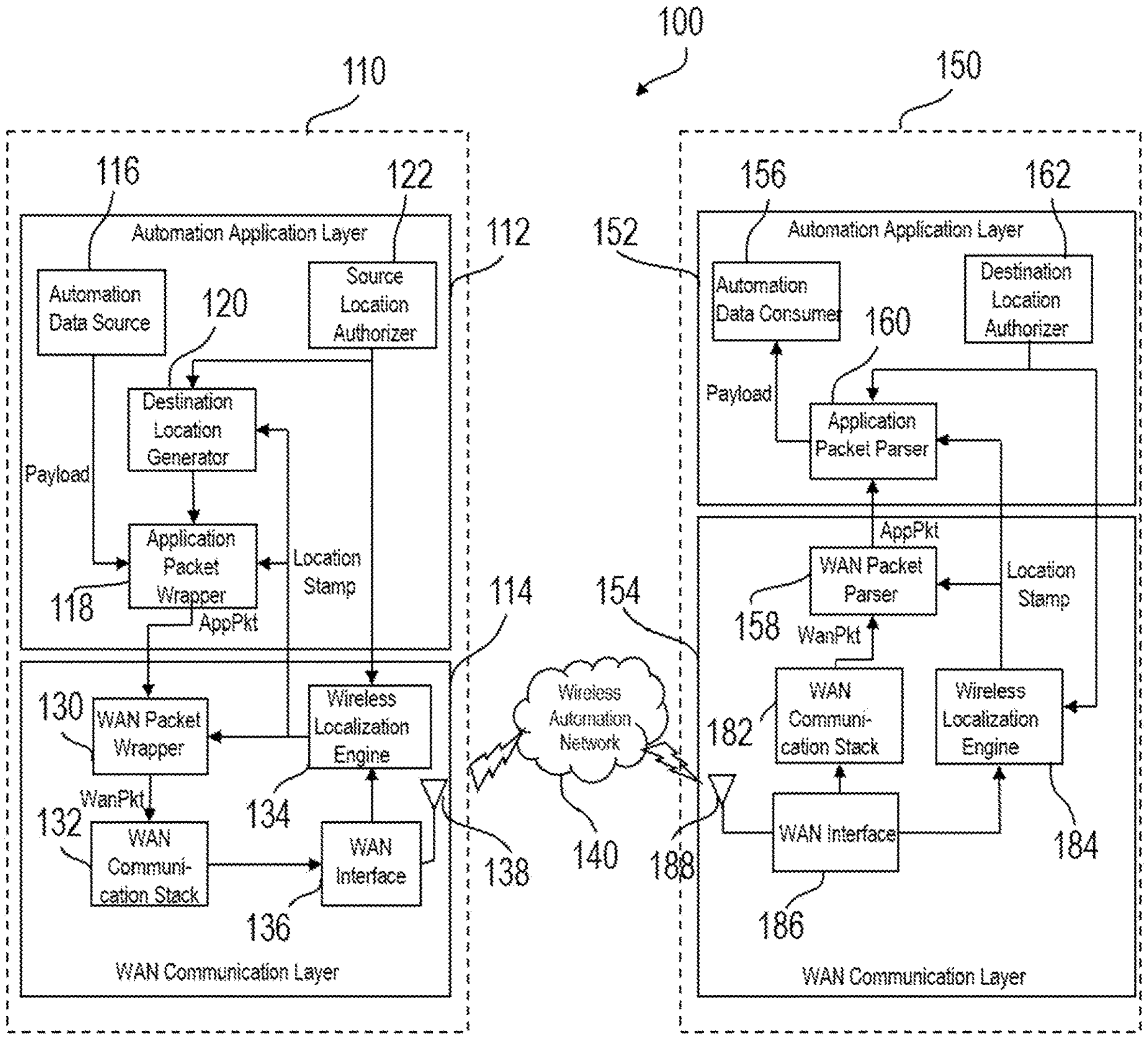
FIG. 1 shows a block diagram of a wireless automation network system according to an embodiment of the present disclosure.
Figure 2:
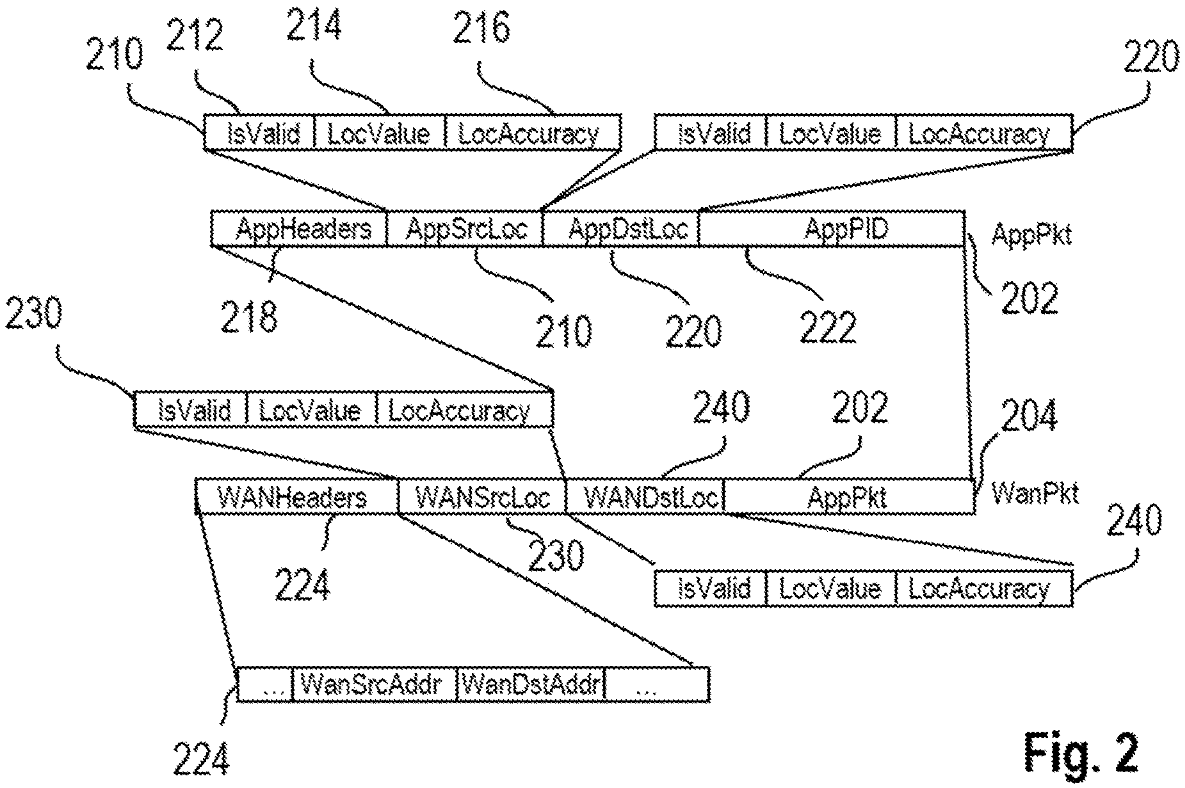
FIG. 2 shows a diagram of a message structure according to an embodiment of the present disclosure.

FIG. 1 shows a diagram of the source device 110 and the destination device 150 with their functional units that are described in the following. The structure of the packets is shown in FIG. 2. The explanations referring to FIG. 3 focus on the packet structure and the processing of the packets. FIG. 4 describes a method for decoding the WAN packet in the destination device 150.

Now referring to FIG. 1, the source device 110 comprises two software layers: the first layer is the automation application layer 112. The second layer is the communication layer 114. The automation data source 116 provides automation data as payload to the application packet wrapper 118. The wireless localization engine 134 located in the communication layer 114 generates a source location stamp and a destination location generator 120 receives the source location stamp and generates a destination location stamp based on the received source location stamp. Both location stamps are provided to the application packet wrapper 118. The source location authorizer 122 provides an information whether an access to the location information is allowed to the destination location generator 120 and to the wireless localization engine 134. The destination location generator 120 and the wireless localization engine 134 add a corresponding valid flag to the source and destination location stamps for indicating whether the source location stamps are valid due to the authorization. The application packet wrapper 118 encodes the location stamps and the payload and outputs an application packet. The WAN packet wrapper 130 in the communication layer 144 receives the application packet and further also receives the location stamp including a valid flag from the wireless localization engine 134 and the destination location generator 120. The WAN packet wrapper 130 then encodes the application packet and the location stamps including the valid flag, and outputs a WAN packet. The WAN packet wrapper sends generated WAN packet over WAN communication stack 132 to the WAN interface 136, so that the packet can be sent as a signal via antenna 138 over the wireless automation network 140 to the antenna of the WAN destination device 150.

The insertion of the local stamp may be performed as described above in both layers or either in the automation application layer or in the WAN communication layer. The processing of locations stamps in the AAL and WCL is determined (i.e., enabled or disabled) according to the configuration of the source location authorizer 122 in the source device 110, and the destination location authorizer and destination device 150, respectively. The packet processing and the valid flag mechanism is described in more detail at hand of FIGS. 3 and 4 below.

In the destination device 150 antenna 188 receives the signal with the transmitted packet and provides the signal to the WAN interface 186, where the signal is demodulated. The WAN interface 186 then sends the demodulated signal with the packet to the WAN communication stack 182, which decodes the packet and passes it to the WAN packet parser 158. The destination location authorizer 162 provides an information whether the WAN packet parser 158 and/or the application packet parser 160 are allowed or authorized to access the wireless localization engine 184 for receiving the locally generated destination location stamp. If yes, the wireless localization engine 184 inserts the localization value, an accuracy value and a valid flag according to the access authorization in the locally generated destination location stamp, the WAN packet parser 158 receives the locally generated destination location stamp from the wireless localization engine 184. The WAN packet parser 158 parses the packet and compares the location stamp in the received packet with the locally generated destination location stamp received from the wireless localization engine 184. The WAN packet parser 158 compares the WAN location stamps if all valid flags are true. If the location stamps do not match the WAN packet parser 158 discards the packet. Otherwise, the WAN packet parser 158 forwards the parsed packet to the application packet parser 160 that extracts the payload and the source location stamp. If the application location stamp valid flag and the extracted application location stamp valid flag are set to true, the application packet parser 160 can compare the location values. If the location stamps do not match it discards the packet. The automation data consumer 165 receives finally the payload. Further, the location values may be provided to other devices in the WAN. The location values may also be sent to a server or into a cloud.

The structure of the WAN packet (WanPkt) processed in the communication layer and the application packet (AppPkt) processed in the application layer are illustrated in FIG. 2. The application packet 202 comprises a header field, the source location stamp field 210, the destination location stamp field 220, and a payload field 202. The source location stamp field 210 and the destination location stamp field 220 each contain a field for the valid flag 212, the location value 215, and the location accuracy 216. Similarly, the WAN packet 204 comprises a header field 224, a source and a destination location stamp field 230, 240 and the above-described application packet field 202. The header field 224 contains the WAN source address and the WAN destination address. Hence, the traditional network addresses (WanSrcAddr and WanDstAddr) are still available in the WAN packet 104, which can be, e.g., the MAC (medium access control) address and/or IP (internet protocol) address.

The location stamps are specified in three fields:

IsValid 212, herein also referred to as (location) valid flag: when true, the location stamp is valid, e.g., if the AAL or WAN is authorized to access the location information. When false, the location stamp is not valid, e.g., if the AAL or WAN is not authorized to access the location information.

LocValue 214: the value of the location. It can be the absolute or relative, 1D (e.g., distance), 2D (e.g., x and y), or 3D (e.g., x, y, and z) coordinates of the location.

LocAccuracy 216: the acceptable error of the location when performing the location matching, i.e., when comparing the location stamp in the packets and the location received from the wireless localization engine 184, a matching condition may be met when the error in between is in the range of LocAccuracy.

Figure 3:
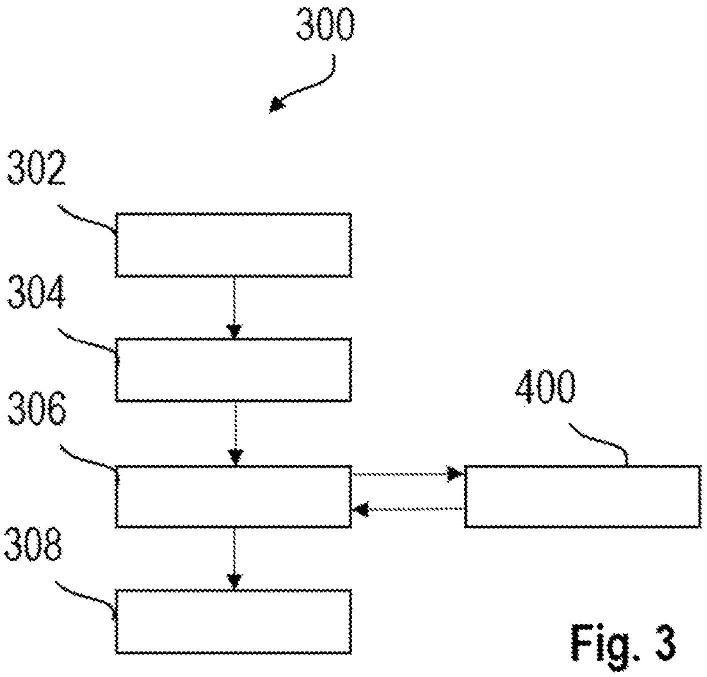
FIG. 3 shows a flow diagram of a method in the wireless automation network according to an embodiment of the present disclosure.
Figure 4:
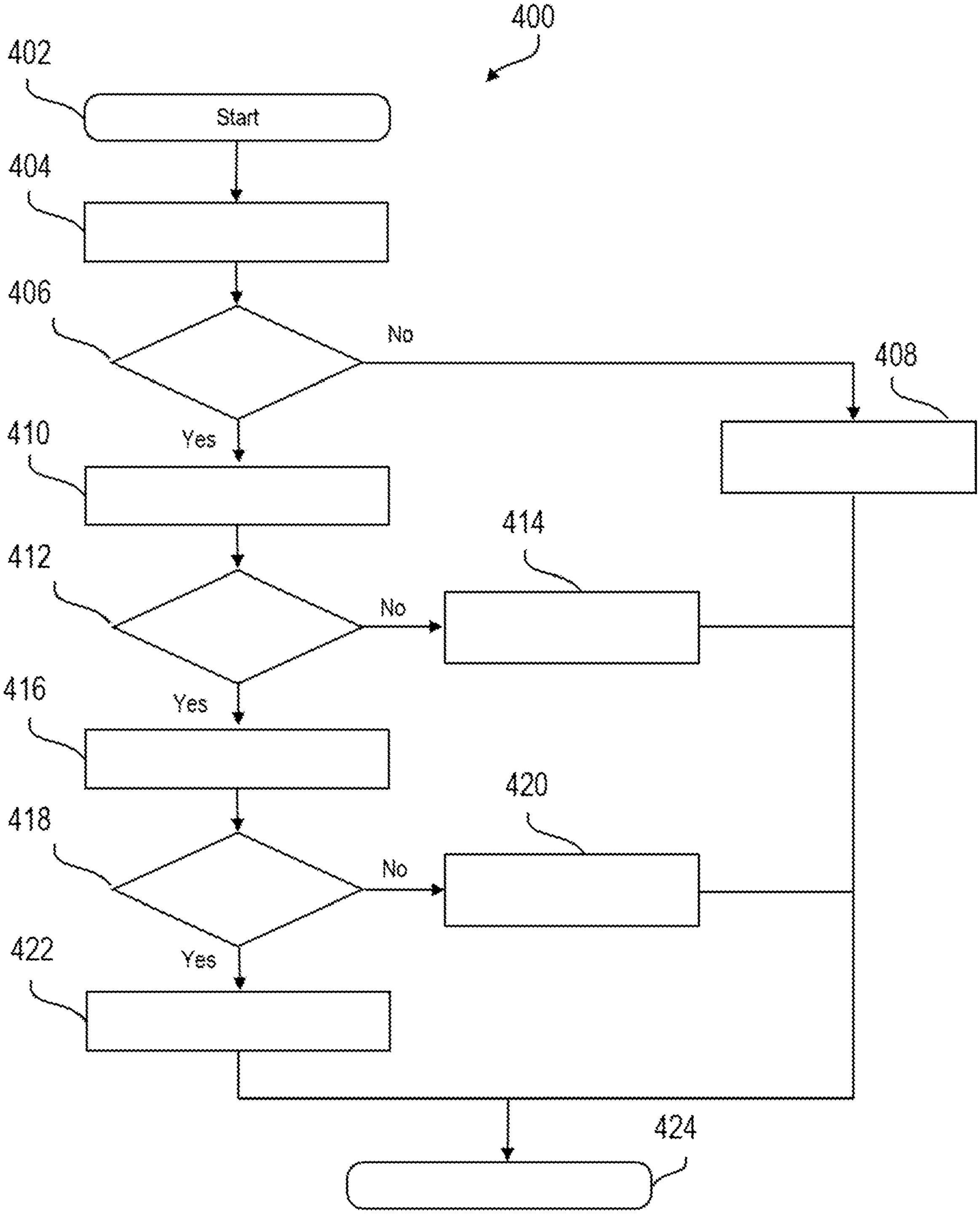
FIG. 4 shows a flow diagram of a method in the wireless automation network destination device.

FIG. 3 in combination with FIGS. 1 and 2 shows a diagram of the steps in the devices and their layers and where the method 400 is invoked.

As an overview, the AAL generates and consumes the application payload (AppPld) data and inserts and parses the AAL source location stamp (AppSrcLoc) and the AAL destination stamp (AppDstLoc) in the application packet (AppPkt). The WCL transmits and receives WAN communication packets (WanPkt) over the WAN network and inserts and parses the WCL source location stamp (WanSrcLoc) and WCL destination location stamp (WanDstLoc) in the application packet (AppPkt).

As indicated above, to give full flexibility source and destination location should be added to the packet information at both the automation application layer as well as WAN communication layers. In addition, it needs to be specified what the required accuracy is for two locations to be considered matching.

Referring now to FIG. 3 and FIG. 2, in a first step 302, in the automation application layer 112 of the link source 110, the automation data source 116 generates the application payload (AppPld) 222, retrieves the source location stamp (AppSrcLoc) 210 from its wireless communication layer 114 if it is authorized, and sets the destination location stamp (AppDstLoc) 240 where the application payload AppPld 222 is supposed to be consumed; and wraps these contents into the Application Packet (AppPkt) 202 together with other application headers (AppHeaders) 218.

In a second step 304, in the wireless communication layer 114 of the link source 110, the WAN packet wrapper 130 retrieves the source location stamp (WanSrcLoc) 230 from the wireless localization engine 134 if it is authorized and sets the destination location stamp (WanDstLoc) 240 where the application packet 202 is supposed to be consumed. Then the WAN communication stack 132 adds other headers (WanHeader) 224 and sends the WAN packet 204 to the link destination 150 through the WAN interface 136.

In a third step 304, in the wireless communication layer 114 of the Link Destination 150, the WAN Packet Parser 158 receives the WAN packet 204 from the WAN interface 186 through the WAN communication stack 182; retrieves the current location from the wireless localization Engine 184 if it is authorized. Then the WAN packet 204 is processed according to the flowchart 400 in the FIG. 4. Optionally, the matching of destination location stamp (WanDstLoc 240 and source location stamp (WanSrcLoc) 230 can be applied independently, i.e., the link destination 150 can be configured to parse the WAN packet 204 according to the source location stamp (WanSrcLoc) 230, or according to the destination location stamp (WanDstLoc) 240, or both.

In a fourth step 308, in the automation application layer 112 of the link destination, the application packet parser receives the application packet 202 (AppPkt) from the wireless communication layer 114; retrieves the current location from its wireless communication layer 114 if it is authorized; then does location matching (i.e. compares the destination location stamp (AppDstLoc) 220 with the current location). If the matching result is true, the application payload (AppPld) 222 will be handed over to the application data consumer after removing the application headers (AppHeaders) 218, application source location stamp (AppSrcLoc) 210, and application destination location stamp (AppDstLoc) 220. Otherwise, the application packet (AppPkt) 202 is discarded.

FIG. 4. shows a method 400 for communication and localization in a wireless automation network, WAN. The method 400 starts at 402. In step 404, a WAN destination address is compared with a local WAN address. In 406 it is checked whether they match. If not, the method continues processing 408 according to the communication protocol. If yes, the WAN destination location value of the location stamp is compared 410 with a location value of the device. In 412 it is checked 412 whether they match. If not, the WAN data packet is discarded 414 and the method returns 424. If yes, the WAN source location value is compared 416 with a configured source location value. In 418 it is checked 418 whether they match. If not, the WAN data packet is discarded 420 and the method returns 424. If yes, the payload is forwarded 422 as application packet to the automation application layer and the method returns 424.

Optionally, the authorizations to access location information at automation application layer 112, 152 and wireless communication layer 114, 154 are independent. In a preferred embodiment, only the wireless communication layer 114, 154 is authorized to access the location information, which will largely reduce the concern about privacy when, for example, wearable or portable devices are used to track the location of personnel. As further options, a physical device can include both the link source 110 and the link destination 150 functionalities for two-way communication, or only one of them for one-way communication.

As specific embodiments, the automation application layer processing and wireless communication layer processing of location stamps can be implemented independently, i.e., it is possible to implement only one of two layers or both layers.

The invention allows reducing the complexity in control applications to utilize the native localization capability of the new generation wireless infrastructure, e.g., 5G and WiFi. Costs for dedicated localization infrastructure. Further, the concern about privacy when wearable or portable devices are used to track personnel location is reduced.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

According to an embodiment, the WAN source device further comprises a destination location generator configured to generate a destination location stamp. The at least one packet wrapper is configured to insert the destination location stamp in the data packet. The destination information may be obtained by configuration, received by an external interface, or derived by configured or received information. Further, source location information may be used to derive the destination information.

According to an embodiment, the WAN source device further comprises a WAN communication layer, WCL, and an automation application layer, AAL. The AAL comprises an application packet wrapper as a first data wrapper configured to generate an application packet comprising the payload. The WCL comprises a WAN packet wrapper as a second data wrapper configured to wrap the application packet and to generate the WAN data packet. The application packet wrapper is configured to insert the source location stamp and the destination location stamp in the application packet and/or the WAN packet wrapper is configured to insert the source location stamp and the destination location stamp in the WAN data packet.

That is, the source location stamp and the destination location stamp can be either inserted into the packet generated in the AAL, or to the packet generated in the WCL, or both. Consequently, in the WAN packet to be transmitted, it is contained once or twice. If it is inserted in the AAL, this resulting application packet including the location stamp is packed as a payload into the WAN packet.

According to an embodiment, the WAN source device further comprises a source location authorizer configured to authorize access to the wireless localization engine from the AAL and/or the WCL.

The control of the access may be performed by the wireless localization engine itself according to an information obtained from the authorizer. The information may be an authorization information to allow access from the AAL and a separate authorization information to allow access from the WCL, or a single information, in case there is only one layer, or in case, the layers are treated the same way.

The authorizer may further be configured to provide the authorization information to the destination location generator. In this way, the destination location generator is enabled to include a valid information, e.g., a valid flag, whether the respective location information is valid into the destination time stamp. Instead of a valid flag, the validity of the location information may be detectable by the value(s) of the location stamps. For example, a default value of zero may indicate a non-valid value.

The source location stamp may hence comprise a field with the source location value, and a further field with the source location stamp validity information. It may further comprise a location accuracy information. The field for the locations value may be initialized with a default value, for example zero or a random value.

The authorizer therefore ensures privacy requirements on both AAL and WCL level.

According to an aspect, a wireless automation network (WAN) destination device is provided. The WAN destination device is configured to receive a WAN data packet according to a WAN communication protocol comprising a payload with automation data, wherein the WAN data packet contains further a source location stamp and/or a destination location stamp. The WAN destination device is configured to match the received source and destination stamp with a locally generated destination stamp and, in case of a match, provide the payload to an automation data consumer.

The received source location stamp contains location information about the source device, and the received destination location stamp contains location information about the destination device. The location information may be provided to further modules in the WAN. The location information about the destination device is not an actual position of the destination device but may indicate a target position or region at/in which the destination may be allowed to extract the payload from the message. The location information about the source device is the actual position of the source device.

According to an embodiment, the WAN destination device comprises a wireless localization engine configured to generate locally a destination location stamp, and at least one packet parser. The at least one packet parser is configured to parse the WAN data packet to extract the payload. It is further configured to extract the source location stamp and/or a destination location stamp. It is furthermore configured to provide the payload to the automation data consumer only when a source location value of the source location stamp of the parsed data packet matches a configured source location value, and/or a destination location value of the location stamp of the parsed data packet matches the destination location value generated by the wireless localization engine in the destination device.

The received source location value contained in the source location stamp may preferably be an absolute 2D or 3D position. The received destination location value contained in the destination location stamp may be an absolute position, a relative position or preferably a distance, i.e., a 1D relative position, indicating an allowed radius around the source location. The locally generated destination location value may preferably be an absolute position.

According to an embodiment, the WAN destination device further comprises a WAN communication layer, WCL, and an automation application Layer, AAL. The WCL comprises a WAN packet parser as a first packet parser configured to parse the WAN packet and to extract an application data packet. The AAL comprises an application packet parser as a second packet parser configured to parse the application packet and to extract the payload and the source location stamp and/or a destination location stamp.

The parsers perform therefore the inverse operation of the wrappers in the source device. Further, they check whether the destination device is located at an allowed position for extracting and forwarding the payload data and or the received location information.

According to an embodiment, the WAN destination device further comprises a destination location authorizer configured to authorize access to the wireless localization engine from the AAL and/or the WCL.

The control of the access may be performed by the wireless localization engine itself according to the information obtained from the authorizer. The information may be an authorization information to allow access from the AAL and a separate authorization information to allow access from the WCL. The authorizer therefore ensures so that privacy requirements is ensured on both AAL and WCL level.

According to an embodiment, the received source location stamp and destination location stamp each comprise a location value, wherein the source location value and/or the destination location value are only accessed when the validity information is true.

The locally generated destination location stamp may comprise further, i.e., apart from the destination location value, the destination location stamp validity information. A validity of the source location value and/or the destination location value is related to the validity information.

There are several options how to proceed in the case of a false flag. For example, the comparison of the location values is skipped, or the packet may be discarded.

According to an embodiment, the received source location stamp and destination location stamp each further comprise an accuracy information, wherein the location accuracy information specifies an accuracy to be considered for determining a match of the source location values and/or destination location values. For example, the location values are considered to match when the distance is lower than the received allowed distance plus the accuracy value.

According to an aspect, a wireless automation network, WAN, system is provided, comprising a WAN source device and a WAN destination device as described herein.

According to a further aspect, a wireless automation network, WAN, device is provided comprising a WAN source device and a WAN destination device as described herein, where the WAN device is a physical device, and the WAN source device and WAN destination device are logical devices. This allows having a bi-directional physical device, comprising a transmitting, and a receiving part.

According to an aspect, a method for communication and localization in a wireless automation network, WAN, device, is provided, comprising the step: receiving a WAN data packet according to a WAN communication protocol comprising a payload with automation data, wherein the WAN data packet contains further a source location stamp and a destination location stamp, matching the received source and destination stamp with a locally generated destination stamp; and, in case of a match providing the payload to an automation data consumer. The step providing the payload to an automation data consumer may comprise extracting the payload from the data packet. Preferably, if there is no match, no extraction of the payload is performed.

According to an embodiment, the method for communication and localization in a wireless automation network, WAN, further comprises the following steps after receiving a WAN data packet: First, compare a WAN destination address with a local WAN address and check whether they match. If they do not match, continue according to the communication protocol. If they match, compare the WAN destination location value of the location stamp with a location value of the device. Then, check whether they match. If they do not match, discard the WAN data packet. If they match, compare the WAN source location value with a configured source location value. Then, check whether they match. If they do not match, discard the WAN data packet. If they match, forward the payload as application packet to the AAL.

According to an aspect, a usage of wireless automation network, WAN, destination device for authenticated wireless communication and for wireless localization is provided. That is, the location information may be used for authentication, and for providing location information. The source device may retrieve its own location information. The destination device may retrieve its own location information and location information of the source device.

The method may be performed by a program element running on a processor or a controller. The program element when being executed by the processor or controller, instructs the destination device to perform the steps of the method. Similarly, the source device may be realized by program element, and a processor or controller on which the program element runs, instructs the source device to perform the functions and methods of the source device to generate and transmit a WAN packet as described herein. The program element may be part of a computer program, but it can also be an entire program by itself. For example, the computer program element may be used to update an already existing computer program to get to the present invention.

The WAN may be based on, e.g., WiFi 802.11az, 3GPP 5G NR release 17, IEEE802.15.4z UWB or other suitable wireless protocols or standards.

The controller may comprise circuits without programmable logics or may be or comprise a micro controller, a field programmable gate array (FPGA), an ASIC, a Complex Programmable Logic Device (CPLD), or any other programmable logic devices known to person skilled in the art. The program element is stored on a computer readable medium. The computer readable medium may be seen as a storage medium, such as for example, a USB stick, a CD, a DVD, a data storage device, a hard disk, or any other medium on which a program element as described above can be stored.

These and other features, aspects and advantages of the present invention will become better understood with reference to the accompanying figure and the following description.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wireless automation network (WAN), comprising:

a WAN source device, wherein the WAN source device is configured to generate a WAN data packet containing a payload with automation data according to a WAN communication protocol, and to transmit the data packet to a WAN destination device;

wherein the WAN source device comprises a source location authorizer, a destination location generator, an application packet wrapper, and a wireless localization engine; and wherein the source location authorizer is configured to provide information whether the destination location generator and the wireless localization engine are authorized for accessing location information;

wherein, when authorization for accessing the location information is permitted;

the wireless localization engine is configured to generate a source location stamp;

the destination location generator is configured to receive the source location stamp and generate a destination location stamp based on the received source location stamp;

the destination location generator and the wireless localization engine are configured to add a corresponding valid flag to the source location stamp and the destination location stamp, the corresponding valid flag indicating whether the respective source location stamp and destination location stamp is valid due to the authorization for accessing the location information; and the application packet wrapper is configured to encode the source location stamp, the destination location stamp, and the corresponding valid flag into an application packet comprising the payload, and to output the application packet for generating the WAN data packet.

2. The wireless automation network according to claim 1, wherein the WAN source device is configured such that the destination location stamp is generated based on the received source location stamp.

3. The wireless automation network according to claim 2, wherein the WAN source device further comprises a WAN communication layer (WCL), and an Automation Application Layer (AAL), wherein the AAL comprises an application packet wrapper as a first data wrapper configured to generate an application packet comprising the payload.

4. The wireless automation network according to claim 3, wherein the WCL comprises a WAN packet wrapper as a second data wrapper configured to wrap the application packet and to generate the WAN data packet.

5. The wireless automation network according to claim 4, wherein the application packet wrapper is configured to encode the source location stamp and the destination location stamp in the application packet and/or the WAN packet wrapper is configured to encode the source location stamp and the destination location stamp in the WAN data packet.

6. The wireless automation network according to claim 3, wherein the WAN source location authorizer is configured to authorize access to the wireless localization engine from the AAL and/or the WCL.

7. A wireless automation network (WAN), comprising:
- a WAN destination device configured to receive a WAN data packet according to a WAN communication protocol comprising a payload with automation data;
- wherein the WAN data packet contains further a source location stamp and/or a destination location stamp; and
- wherein the WAN destination device comprises a WAN packet parser, an application packet parser, a wireless localization engine configured to generate a locally generated destination location stamp, and a destination location authorizer;
- wherein the destination location authorizer is configured to provide information whether the WAN packet parser and the application packet parser are authorized to access the wireless localization engine for receiving the locally generated destination location stamp;
- wherein, when the authorization is valid, the wireless localization engine is configured to insert a valid flag according to the authorization in the locally generated destination location stamp;
- wherein the WAN packet parser is configured to receive the locally generated destination location stamp from the wireless localization engine, compare the destination location stamp in the received WAN data packet with the locally generated destination location stamp, discard the WAN data packet if the comparison does not indicate a match, and forward an application packet of the WAN data packet to the application packet parser if the comparison indicates the match; and
- wherein the application packet parser is configured to extract the payload and the source location stamp from the application packet.

8. The wireless automation network according to claim 7, wherein the WAN destination device further comprises a wireless localization engine configured to generate a destination location stamp.

9. The wireless automation network according to claim 7, further comprising:
- a WAN source device configured as in claim 1.

10. The wireless automation network according to claim 8, wherein the WAN destination device further comprises at least one packet parser configured to parse the WAN data packet to extract the payload and the source location stamp and/or a destination location stamp, and to provide the payload to an automation data consumer only when a source location value of the source location stamp of the parsed data packet matches a configured source location value, and/or a destination location value of the location stamp of the parsed data packet matches the destination location value generated by the wireless localization engine in the destination device.

11. The wireless automation network according to claim 10, wherein the WAN destination device further comprises a WAN communication layer (WCL), and an automation application Layer, AAL.

12. The wireless automation network according to claim 11, wherein the WCL comprises a WAN packet parser as a first packet parser configured to parse the WAN packet and to extract an application data packet; and wherein the AAL comprises an application packet parser as a second packet parser configured to parse the application packet and to extract the payload and the source location stamp and/or a destination location stamp.

13. The wireless automation network according to claim 11, wherein the WAN destination device further comprises a destination location authorizer configured to authorize access to the wireless localization engine from the AAL and/or the WCL.

14. The wireless automation network according to claim 13, wherein the received source location stamp and destination location stamp each comprise a location value, and the destination location value and/or the source location value are only accessed when the validity information is true.

15. The wireless automation network according to claim 13, wherein the received source location stamp and destination location stamp each comprise an accuracy information, wherein the accuracy information specifies an accuracy to be taken into account for determining a match of the source location values and/or destination location values.

16. A method for communication and localization in a wireless automation network (WAN), comprising:
- generating, by a wireless localization engine of a WAN destination device, a locally generated destination location stamp;
- providing, by a destination location authorizer, information whether a WAN packet parser and an application packet parser are authorized to access the wireless localization engine for receiving the locally generated destination location stamp;
- when the authorization is valid, inserting, by the wireless localization engine, a valid flag according to the authorization in the locally generated destination location stamp;
- receiving, by the WAN packet parser, the locally generated destination location stamp from the wireless localization engine and a WAN data packet comprising a payload with automation data and containing a source location stamp and a destination location stamp;
- comparing, by the WAN packet parser, the destination location stamp in the received WAN data packet with the locally generated destination location stamp;
- discarding the WAN data packet when the comparison does not indicate a match;
- forwarding an application packet to the application packet parser when the comparison indicates the match; and
- extracting the payload and the source location stamp.

17. The method according to claim 16, further comprising, after receiving a WAN data packet:

comparing a WAN destination address with a local WAN address, and checking whether the WAN destination address matches the local WAN address;

when the WAN destination address does not match the local WAN address, continuing execution according to a communication protocol;

when the WAN destination address matches the local WAN address, comparing a WAN destination location value of the location stamp with a location value of the device, and checking whether the WAN destination location value matches the location value of the device;

when the WAN destination location value does not match the location value of the device, discarding the WAN data packet; when the WAN destination location value matches the location value of the device, comparing a WAN source location value with a configured source location value, and checking whether the WAN source location value matches the configured source location value;

when the WAN source location value does not match the configured source location value, discarding the WAN data packet; and when the WAN source location value matches the configured source location value, forwarding the payload as application packet to an AAL.

* * * * *